United States Patent Office 3,230,937
Patented Jan. 25, 1966

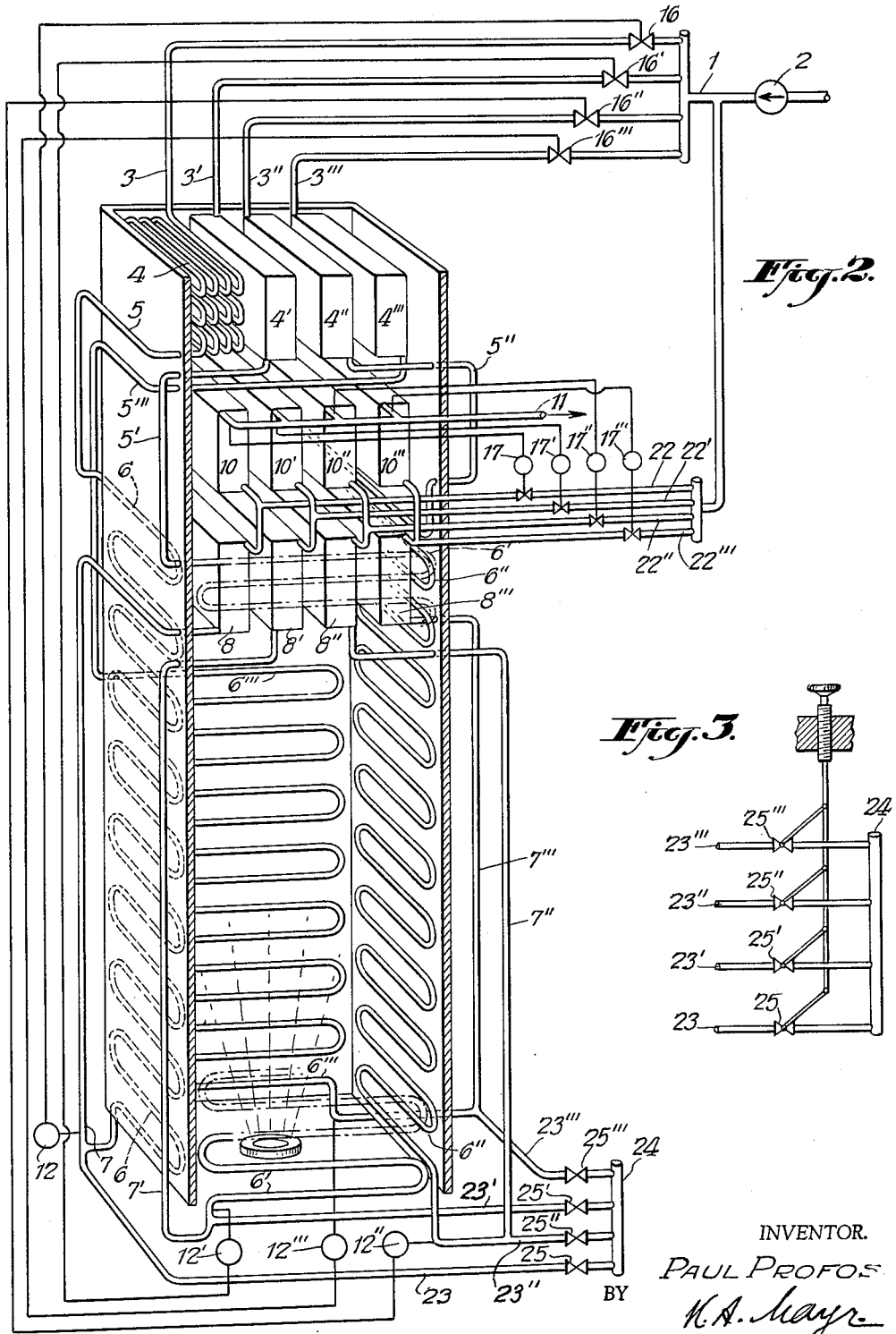

3,230,937
METHOD AND APPARATUS FOR OPERATING A FORCED FLOW STEAM GENERATOR
Paul Profos, Winterthur, Switzerland, assignor to Sulzer Freres S.A., Winterthur, Switzerland, a corporation of Switzerland
Filed June 16, 1961, Ser. No. 117,635
Claims priority, application Switzerland, June 21, 1960, 7,052/60
4 Claims. (Cl. 122—451)

The present invention relates to a method for operating a forced flow steam generator having at least two tube systems through which the operating medium flows in parallel relation, each tube system including at least two heating sections arranged in series relation with respect to the flow of the operating medium, each heating section comprising a plurality of heating tubes through which the operating medium flows in parallel relation. The invention also relates to an apparatus for carrying out the method.

In large steam generators of the aforedescribed type unequal flow rates of the operating medium through the individual tube systems are unavoidable, because it is impossible to place the fire in the combustion chamber absolutely symmetrical with respect to the portions of the heating tube systems placed in and adjacent to the combustion chamber and to obtain equal heat absorption by the individual tube systems. Heat absorption of the parts of the tube systems located in the flue is usually more equal but not exactly equal and temperature differences of the steam leaving the heating sections which receive heat primarily by convection can be equalized by injecting water. This, however, involves thermodynamic losses which may be quite great in large steam generators.

It is an object of the present invention to provide a method and means for reducing the differences of the flow rates of the operating medium through the individual tube systems in a steam generator having a plurality of tube systems arranged in parallel with respect to the flow of the operating medium, before the operating medium enters the last heating sections of the tube systems whereby the difference between the temperatures of the steam passing through the last heating sections caused by different flow rates and/or different heat absorption in the last heating sections is minimized and the required amounts of cooling water injected upstream of the last heating sections are reduced. With the method and apparatus according to the invention the thermodynamic losses caused by the water injection are reduced. The control range to be satisfied by the water injection control valves is also reduced so that relatively small control valves are required and the entire water injection system becomes smaller and less expensive.

The aforedescribed objects are achieved by controlling the flow rates of the feedwater supplied to the individual tube systems in response to the heat absorbed by the operating medium in the first heating section or sections of the tube systems which is evidenced by the temperature of the operating medium leaving these sections. Since the heat absorption by the first section or sections is different in the individual tube systems, the feedwater flow rates are also different. These differences are reduced by connecting the tube systems downstream of the first section or sections by means of valved equalizing tubes.

The apparatus according to the invention comprises at least as many valved connecting tubes as there are tube systems, all of said tubes being interconnected and the valves being interposed in said tubes between the respective tube system and the locality where all tubes are interconnected.

The novel features which are considered characteristic of the invention are set forth with particularity in the appended claims. The invention itself, however, and additional objects and advantages thereof will best be understood from the following description of embodiments thereof when read in connection with the accompanying drawing wherein:

FIG. 2 is a diagrammatic, partly perspective, illustration of a forced flow steam generator including the system according to the invention.

FIG. 3 is a diagrammatic illustration of a modified detail of the system shown in FIG. 2.

Figure 1:
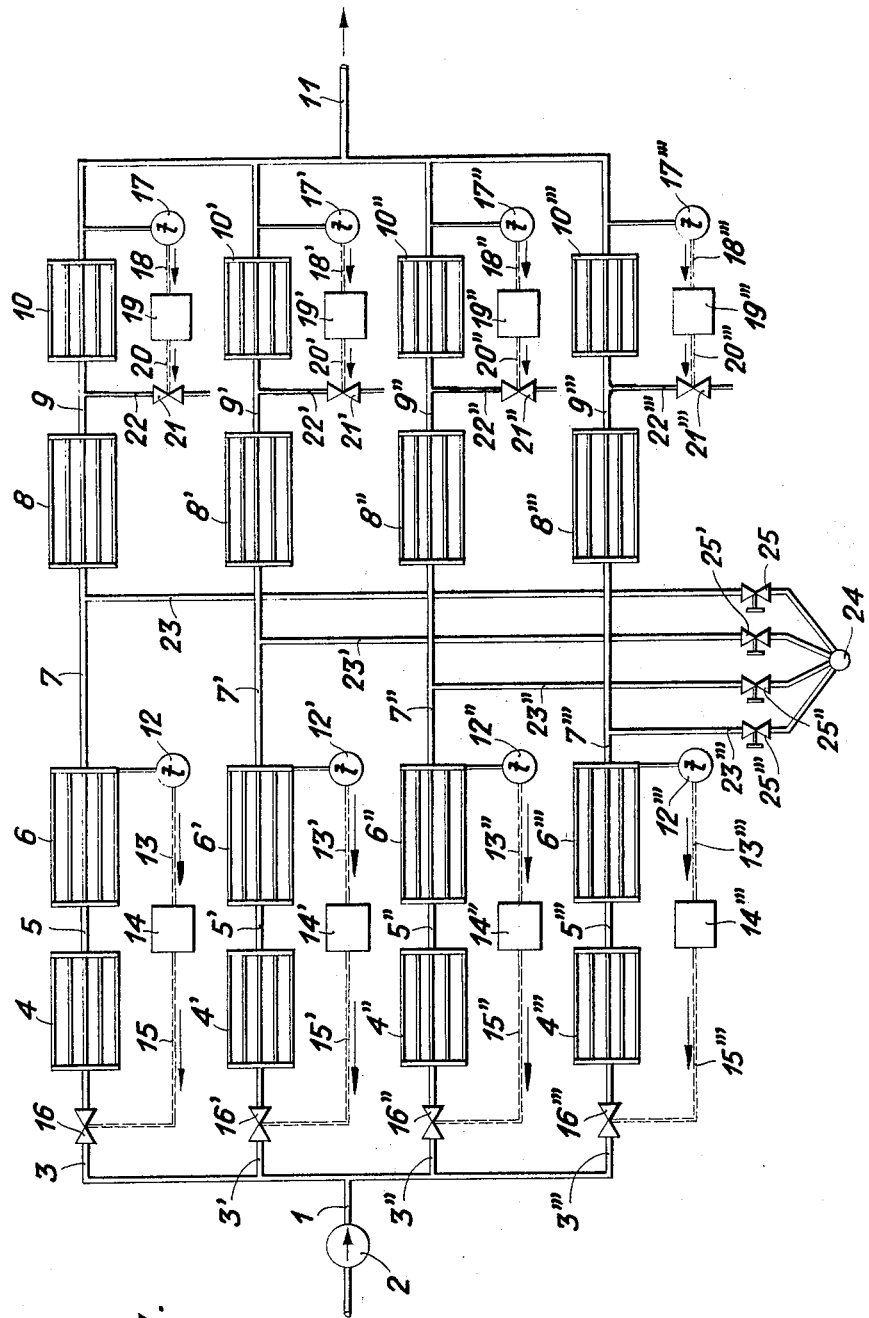
FIG. 1 is a diagrammatic illustration of the heating tube arrangement of a forced flow steam generator to which the system according to the invention is applied.

Referring more particularly to the drawing, numeral 1 designates a feed pipe into which feedwater is pumped by a feed pump 2. Four pipes 3, 3', 3" and 3''' are connected to the feed pipe 1 to receive water therefrom in parallel relation with respect to the flow of the feedwater. Each of the pipes 3, 3', 3" and 3''' supplies water to a tube system comprising a plurality of consecutive sections through which the water and steam generated therein flows in series relation. The tube systems are substantially equally constructed. Each tube system comprises an economizer section 4, 4', 4" and 4'''. Each economizer section comprises a plurality of tubes through which the water flows in parallel relation. The economizer sections are individually connected by pipes 5, 5', 5" and 5''' to evaporating sections 6, 6', 6" and 6''', respectively. Each evaporating section comprises a plurality of tubes connected in parallel with respect to the flow of the operating medium therethrough. The evaporating sections are connected by pipes 7, 7', 7" and 7''' to first superheaters 8, 8', 8" and 8''', respectively. Each first superheater comprises a plurality of tubes connected in parallel with respect to the flow of steam. Each first superheater is connected by a pipe, 9, 9', 9" and 9''' to a final superheater 10, 10', 10" and 10''', respectively. Each final superheater comprises a plurality of tubes connected in parallel with respect to the steam flow. The outlets of the superheaters are connected to a live steam pipe 11 which supplies steam to a steam consumer, not shown, for example to a turbine.

A temperature sensing device 12, 12', 12" and 12''' is provided at the outlet of each of the evaporators 6, 6', 6" and 6'''. The temperature sensing devices individually produce control signals in the conventional manner which are conducted through conduits 13, 13', 13" and 13''', respectively, to regulators 14, 14', 14" and 14''', respectively. The regulators are of conventional design and have, for example, a proportional-integral-differential (PID) characteristic. The regulators individually produce signals conducted through conduits 15, 15', 15" and 15''' to motor operators, not shown, for actuating valves 16, 16', 16" and 16''', respectively, interposed in the pipes 3, 3', 3" and 3''', respectively. In this way the rate of flow of water to the economizers and evaporators connected thereto in series relation is individually controlled according to the temperatures at the outlets of the evaporators.

Downstream of each final superheater 10, 10', 10" and 10''' a temperature sensitive device 17, 17', 17" and 17''', respectively, is provided, producing control signals which are conducted through conduits 18, 18', 18" and 18''', respectively, to regulators 19, 19', 19" and 19''', respectively. These regulators have, for example, also a PID characteristic. The output signals produced in the regulators are conducted through conduits 20, 20', 20" and 20''' to valves 21, 21', 21" and 21''' for actuating these valves. The latter are interposed in pipes 22, 22', 22" and 22"', respectively, which are supplied with feedwater from the feed pipe 1 and serve for injecting feedwater into the pipes 9, 9', 9" and 9"' interconnecting the first and the final superheaters. The rate of injection of cooling water into the steam coming from the first superheaters 8, 8', 8" and 8"' is controlled in response to the final temperatures of the steam.

In the example shown in FIG. 2 the economizers 4, 4', 4" and 4"' are arranged in the last portion of the boiler flue, the evaporators 6, 6', 6" and 6"' are exposed to radiant heat in the combustion chamber and the first superheaters 8, 8', 8" and 8"' and the final superheaters 10, 10', 10" and 10"' are placed in the first part of the flue, upstream of the economizers with respect to the flow of the combustion gases. A tube 23, 23', 23" and 23"' is connected to each of the pipes 7, 7', 7" and 7"', the tubes being connected to a common header 24, a valve 25, 25', 25" and 25"' being interposed in each tube. This arrangement causes a reduction of the differences between the flow rates of the steam discharged by the evaporators before the steam enters the first superheaters 8, 8', 8" and 8"' so that the flow rates of the steam through the superheaters can be better adapted to the heat transfer conditions in the superheaters. The aforesaid differences of the flow rates of the steam from the evaporators are caused, for example by dislocation of the fire, unequal sooting and scaling of the heating surfaces in the combustion chamber, and the like. If for example, the flow rates of the steam leaving the evaporators 6, 6', 6" and 6"' amount to 1.2, 1, 0.9 and 0.8, respectively, the valves 25, 25', 25" and 25"' can be so adjusted that the rates of flow of the steam into the first superheaters 8, 8', 8" and 8"' amount to only 1.1, 1, 0.95 and 0.9, respectively. In this case the settings of the valves would be changed substantially equally. Generally, the differences between the flow rates are reduced by opening the valves.

In a modification, not shown, of the apparatus according to the invention each superheater comprises three sections connected in series relation with respect to the flow of steam therethrough, the first superheater section receiving heat by convection, the second superheater section being exposed to radiant heat, and the third superheater section receiving heat by convection. A cooling water injection device is arranged upstream of each of the third sections for controlling the final steam temperature. In this arrangement it is advisable to provide two tube systems, the first tube system being connected to connecting tubes between the evaporators and the first superheater sections and the second tube system being connected downstream of the second superheater sections and upstream of the water injecting devices which are upstream of the third superheater sections, the throttle valves in the first tube system being more closed than the throttle valves of the second tube system.

As shown in FIG. 3, the throttle valves 25, 25', 25" and 25"' may be interconnected for simultaneous operation so that the operator of the steam generator need manipulate only one device instead of four in the illustrated example. This arrangement is satisfactory in steam generators where there are no particularly unfavorable conditions in one or more of the parallel flow systems.

The invention is not limited to steam generating plants wherein several tube systems are supplied by a common feed pump, but may also be applied to steam generating apparatus including several feed pumps, for example, a feed pump for each tube system or for every two tube systems, whereby the tube systems are preferably interconnected by valved conduits arranged upstream of the feed valves 16, 16', 16" and 16"' so that, if one of the pumps fails, the respective tube system or systems can be supplied with feedwater by the other pumps.

The invention is also not limited to arrangements wherein all tube systems are associated with the same combustion chamber and flue receiving combustion gas therefrom. The tube systems may be distributed over two separately heated combustion chambers and flues connected therewith.

I claim:

1. In a forced flow steam generator having at least two separate heating tube systems arranged in parallel relation with respect to the flow of water and steam therethrough, each tube system having at least two heating sections arranged in series relation with respect to the flow of water and steam therethrough, and each heating section including a plurality of heating tubes arranged in parallel relation with respect to the flow of water and steam therethrough: means for forcing flow of operating medium through said tube systems, means for supplying heat commonly to all of said tube systems, a feedwater supply control valve in each of said tube systems upstream of the first heating section thereof, temperature sensing means connected to each tube system downstream of the first heating section thereof and upstream of the last heating section of the tube system and connected to said feedwater supply control valve of the respective tube system for opening said valve upon a rise of the temperature sensed by said temperature sensing means above a predetermined value and conversely, each of said tube systems including a tube connecting two consecutive heating sections of the tube system, and pipes provided with throttling means and having first ends individually connected to said tubes, the second ends of said pipes being connected for communicating said pipes with each other for conducting, at a controlled rate, operating medium from at least one of said tube systems wherein the flow rate of the operating medium is relatively high to a tube system wherein the flow rate is relatively low for reducing the difference between the flow rates in the tube systems and avoiding complete equalization of the flow rates.

2. In a forced flow steam generator as defined in claim 1 wherein the two consecutive heating sections connected by said tube are an evaporating section and a superheating section.

3. In a forced flow steam generator having at least two separate heating tube systems arranged in parallel relation with respect to the flow of water and steam therethrough and heated by a single source of heat, each tube system having at least two heating sections arranged in series relation with respect to the flow of water and steam therethrough, and each heating section including a plurality of heating tubes arranged in parallel relation with respect to the flow of water and steam therethrough:

a feedwater supply control valve in each of said tube systems upstream of the first heating section thereof, temperature sensing means connected to each tube system downstream of the first heating section thereof and upstream of the last heating section of the tube system and connected to said feedwater supply control valve of the respective tube system for opening said valve upon a rise of the temperature sensed by said temperature sensing means above a predetermined value and conversely, each of said tube systems including a tube connecting two consecutive heating sections of the respective tube system, pipes having first ends individually connected to said tubes, the second ends of said pipes being connected for communicating said pipes with each other, adjustable throttling means in each of said pipes for adjusting the rate of flow of operating medium from at least one of said tube systems wherein the flow rate of the operating medium is relatively high to at least one of said tube systems wherein the flow rate of the operating medium is relatively low, and common actuating means connected to said throttling means for simultaneous adjustment of said throttling means.

4. A method of operating a forced flow steam generator having at least two separate heating tube systems arranged in parallel relation with respect to the flow of water and steam therethrough, each tube system having at least two heating sections arranged in series relation with respect to the flow of water and steam therethrough and a tube means connecting said two heating sections, each heating section including a plurality of heating tubes arranged in parallel relation with respect to the flow of water and steam therethrough and common heat supply means for all heating tube systems, said method comprising the steps of (1) forcing flow of operating medium through the heating tube systems, (2) supplying heat commonly to all tube systems, (3) adjusting the rate of flow of feedwater into the first heating section of each tube system in response to the temperature of the operating medium downstream of the first heating section and upstream of the last heating section of the respective tube system, and (4) adjustably throttling the rate of flow of operating medium in the tube means of at least one of the tube systems wherein the flow rate of the operating medium is relatively high to at least one of said tube systems wherein the flow rate of the operating medium is relatively low, whereby the differences between rates of flow of operating medium in the respective tube systems are reduced without equalizing said rates of flow.

References Cited by the Examiner

UNITED STATES PATENTS

| | | | |
|---|---|---|---|
| 1,975,096 | 10/1934 | Fletcher. | |
| 2,000,966 | 5/1935 | Luche | 122—451 |
| 2,273,629 | 2/1942 | Dickey | 122—448 |
| 2,702,026 | 2/1955 | Dalin | 122—448 |
| 2,800,887 | 7/1957 | Profos | 127—451.1 |
| 3,117,620 | 1/1964 | Fuller Jr. | 122—406 |

FOREIGN PATENTS

| | | |
|---|---|---|
| 1,185,817 | 2/1959 | France. |
| 302,241 | 3/1930 | Great Britain. |
| 787,006 | 11/1957 | Great Britain. |
| 806,561 | 12/1958 | Great Britain. |

FREDERICK L. MATTESON, Jr., *Primary Examiner.*

ALDEN D. STEWART, PERCY L. PATRICK, KENNETH W. SPRAGUE, *Examiners.*